Oct. 17, 1967     W. I. LINDGREN     3,347,569
CONDUIT CONNECTING STRUCTURE AND METHOD
Filed Oct. 4, 1965     2 Sheets-Sheet 1
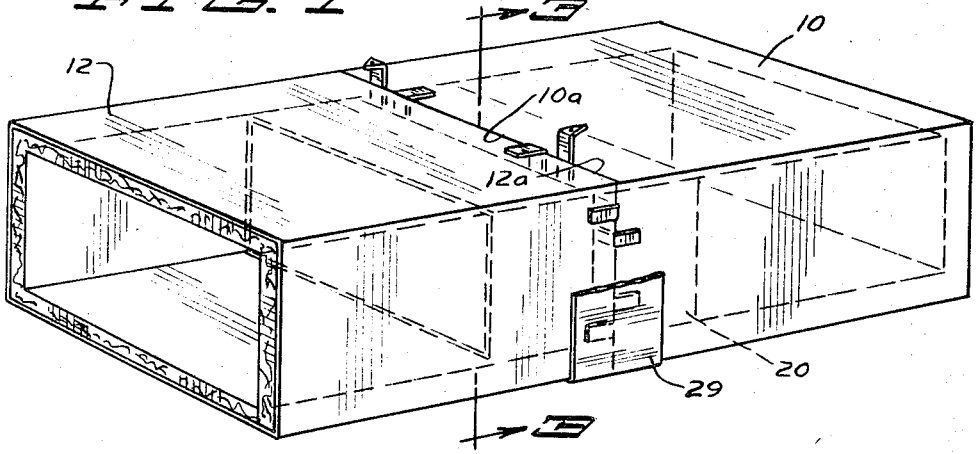
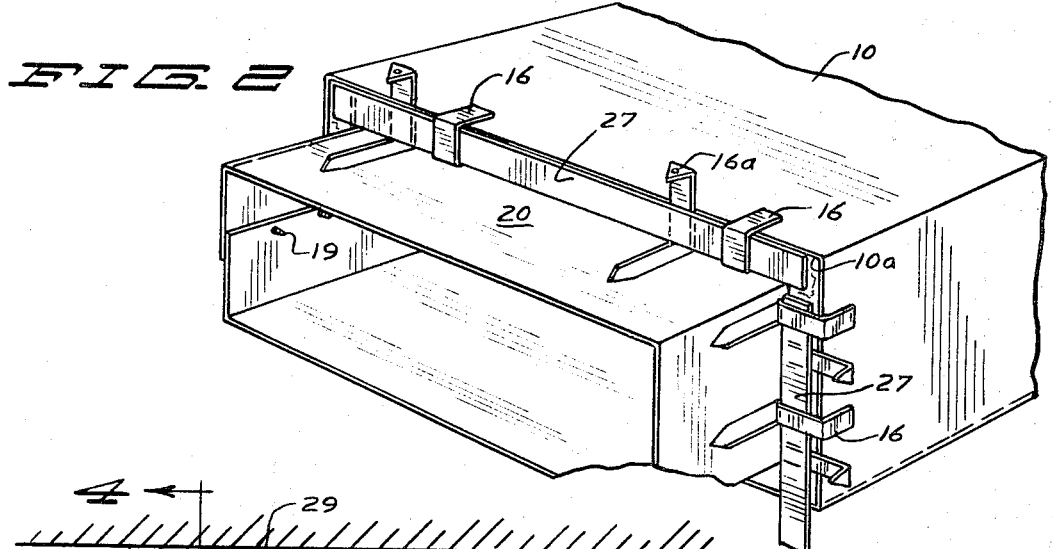
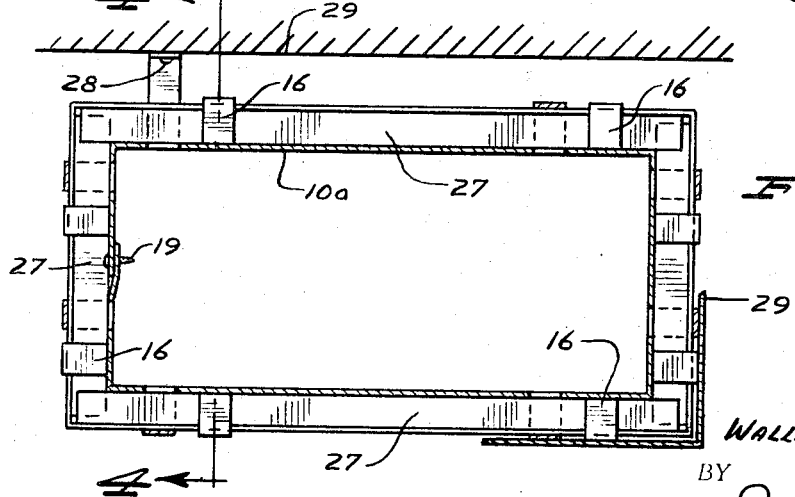
INVENTOR.
WALLACE I. LINDGREN
BY
Richard Gregory
ATTORNEYS Oct. 17, 1967   W. I. LINDGREN   3,347,569
CONDUIT CONNECTING STRUCTURE AND METHOD
Filed Oct. 4, 1965   2 Sheets-Sheet 2
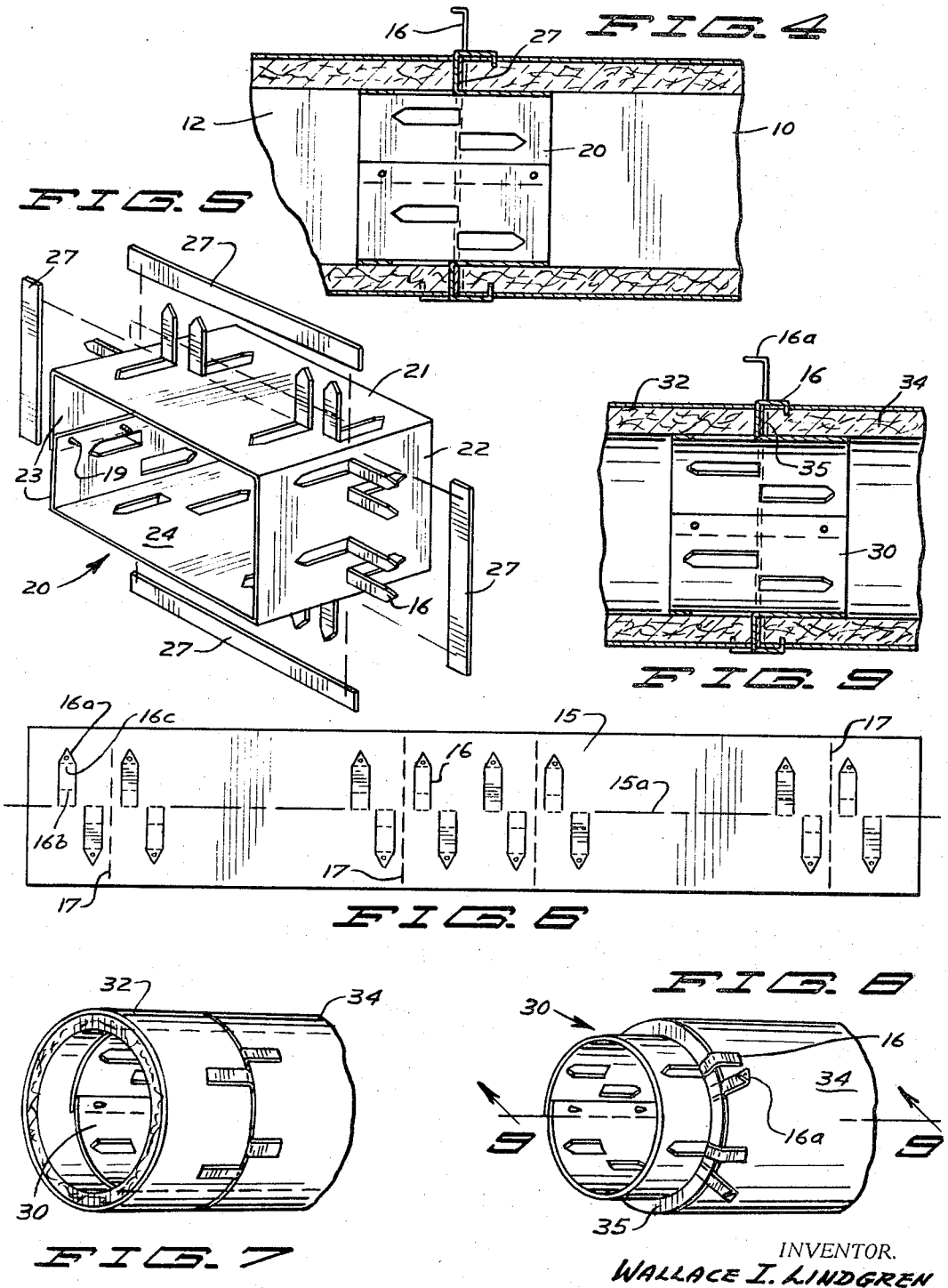
INVENTOR.
WALLACE I. LINDGREN
BY
Reifand Gregory
ATTORNEYS United States Patent Office 3,347,569
Patented Oct. 17, 1967

3,347,569
CONDUIT CONNECTING STRUCTURE AND METHOD
Wallace I. Lindgren, 3723 Dartmouth Drive, Minnetonka, Minn. 55343
Filed Oct. 4, 1965, Ser. No. 492,797
3 Claims. (Cl. 285—64)

ABSTRACT OF THE DISCLOSURE

This invention concerns an internal sleeve coupling for axially joining the ends of thick walled air ducts. Longitudinally extending, bendable tabs are struck in alternate directions from the middle of the sleeve and bent alternately in opposite directions around a flange-like stiffening member. The tab ends are then fastened by pressing them through slots in the outer cover of the ducts.

---

This invention relates to improvement in a connecting structure for conduits, with particular reference being had to conduits used in connection with air conditioning systems having to do with providing passage with either heated or cooled air.

More specifically this invention has to do with relatively soft walled conduits formed of insulating material such as being formed of sheet material of compressed glass wool, said conduits being rectangular or circular in cross section.

It is customary to provide such conduits as indicated in sections of relatively short lengths for convenience of installation, and this invention has to do with connecting such sections and for providing hanging means for the same.

It is an object of this invention to provide means for connecting adjacent ends of relatively soft walled or non-metallic conduit and to provide stiffening means in connection therewith to make rigid cross sectional areas of said conduit and to provide hangers in connection therewith.

It is another object of this invention to provide connecting means for such conduit as above indicated, said means comprising a body portion partially insertable into the abutting end portions of adjacent sections of said conduit and having means integral therewith engaging and securing together said adjacent ends and cross sectional stiffening means in connection therewith.

It is also an object of this invention to provide a method for forming means for connecting adjacent sections of conduit, such as above indicated, for holding the same together and to provide stiffening means for the connected portions of said conduit.

These and other objects and advantages of the invention will be set forth in the following description made in connection with the accompanying drawings in which like reference characters refer to similar parts throughout the several views and in which:

FIG. 1 is a perspective view of the apparatus herein in operating position showing portions thereof in dotted line and some portions thereof being broken away;

FIG. 2 is a broken view similar to FIG. 1 showing the apparatus herein in perspective in connection with an installation thereof with one section of conduit;

FIG. 3 is a view in cross section taken on line 3—3 of FIG. 1 as indicated;

FIG. 4 is a broken view in vertical section taken on line 4—4 of FIG. 3 as indicated;

FIG. 5 is an exploded view in perspective of the apparatus herein;

FIG. 6 is a plan view showing a blank from which the principal portion of the apparatus herein is formed;

FIG. 7 is a broken view in perspective showing a modified form of the apparatus herein as installed;

FIG. 8 is a view similar to FIG. 7 showing the apparatus herein in installed position in connection with one conduit; and FIG. 9 is a broken view in substantially horizontal section taken on line 9—9 of FIG. 8 as indicated.

It is desirable to use a conduit made of compressed insulating material, such as of glass wool or equivalent fibers, for conveying or providing passage for cool or heated air in connection with an air conditioning system. Such conduits are provided in relatively short lengths for convenience of installation and such sections are commonly of four foot lengths. Such conduits are of relatively soft wall structure and when made of any substantial size in cross section lack the stiffening qualities which are present in conduits which are formed, such as of sheet metal. The invention herein provides a convenient and efficient means not only for joining together the ends of adjacent sections of such relatively soft walled conduit, but also to provide cross sectional stiffness at the juncture of such ends.

With reference to the drawings, and particularly to FIGS. 1–6, a pair of abutting conduit sections indicated as being formed of glass wool sheet material are indicated generally by the characters 10 and 12. Said sections have adjacent end portions 10a and 12a. Such conduits may take on any cross sectional form, but for purpose of illustration are shown to be rectangular in cross section.

With reference to FIG. 6, a blank 15 is shown rectangular in plan, and preferably this blank will be formed of a suitable material, such as of sheet metal. Die cut to be struck from said blank are strap members or tabs 16 having apertured pointed free end portions 16a. Said strap members are joined to said blank along a medial line 15a thereof. Alternate of said straps are struck from opposite sides of said medial line. Longitudinally spaced transverse scoring lines 17 will be formed in said blank at predetermined points thereof to form said blank into the endelss member 20 which will be of a predetermined cross sectional size and form such as to be received within the adjacent end portions of the conduit sections 10 and 12. The free ends of said blank 15 will be secured together as by sheet metal screws 19. The formed blank 20 which is shown to be rectangular in cross section and generally parallelepiped in form will have a width to have a suitable length thereof inserted within the adjacent ends of said conduit sections 10 and 12.

Said member 20 comprises a top wall 21, side walls 22 and 23, and a bottom wall 24. Said strap members 16 will be bent to be at right angles to or upstanding from said member 20. Said strap members will be transversely scored at line 16b and at line 16c. The line 16b will be spaced upwardly from the bottom of said strap a distance equivalent to the thickness of a wall portion of said conduit. Said second score line 16c will provide for a reverse bend of the end portion of the strap member for the insertion thereof into adjacent edge portions of the conduit sections, as illustrated.

It will be understood that said strap members may be variously formed and secured to the connecting member 20, but for purpose of convenience and simplicity said strap members are here being shown as being struck from the body of the blank 16.

Referring to FIG. 2, said member 20 is shown having one portion thereof inserted within the conduit section 10, and in FIG. 1 in dotted line said member 20 is shown inserted within the adjacent abutting sections 10 and 12. Alternate of said strap members, as illustrated, will be oppositely bent along their respective score lines with the free end portions 16a thereof being inserted into the adjacent wall structure of said sections. Also as indicated in FIG. 3, certain of said strap members will remain upstanding to be used as hangers.

To provide cross sectional stiffness at points of connection, elongated plate-like stiffening members 27 are provided which will be inserted upstanding from one longitudinal edge, as illustrated, between alternate of said strap members 16. Said strap members will have a length to correspond with each side of the member 20 and will have a height to correspond with the wall thickness of the conduit. Thus said stiffening members will be hidden in operating position. Said stiffening members may be inserted between said strap members before the strap members are bent, or they may be slipped into position after the strap members are bent and the adjacent conduits are joined together. This becomes a matter of preference.

When said strap members have been bent into position, it is desirable to cover the seam between the adjacent conduit sections and the exposed bent portions of said straps. Said seam and straps are readily covered, as by a strip of adhesive 29, said adhesive strip for this purpose being known in the art.

It is believed that the installation of the connecting member herein is quite obvious from the description above given.

With reference to FIGS. 7–9, a modification is shown of the connecting member 20 in which a cylindrical member 30 is formed to be used with round conduit sections 32 and 34. In connection with said member 30, a circular ring-like stiffening member in the form of a collar 35 is shown. This will be installed in operating position prior to the time when the straps 16 are raised from one side of the medial line of the member 30 about which said straps are formed. Other than the difference in the cross sectional form of said members 30 and 20, they will be made of identical blank members 15, as shown in FIG. 6.

Thus it is seen that I have provided a simply formed connecting member for relatively soft walled conduits providing for a quick and efficient connecting of sections of such conduit and providing also for cross sectional stiffening thereof.

It will of course be understood that various changes may be made in the form, details, arrangement and proportions of the apparatus and in the steps and sequence of steps of the method without departing from the scope of applicant's invention which, generally stated, consists in a method and apparatus capable of carrying out the objects above set forth, such as disclosed and defined in the appended claims.

What is claimed is:

1. A connecting apparatus in connection with relatively soft walled conduit having in combination,
    an endless collar of a size and form to be inserted within the abutting ends of a pair of said conduits,
    said collar having a plurality of strap members integral therewith and upstanding therefrom spaced apart on a medial line thereabout, alternate of said strap members being oppositely reversely angled to have portions thereof inserted into adjacent wall portions of said conduit, and
    a rigid elongated plate member inserted between adjacent of said strap members between the abutting ends of said conduit.

2. A connecting apparatus for abutting ends of adjacent sections of a pair of conduits of the character indicated comprising
    an endless collar of a size and cross sectional form such as to be inserted within said abutting ends of said conduit,
    a plurality of spaced strap members integral with and upstanding from said endless member,
    an elongated rigid stiffening member disposed between said abutting ends of said conduit and supported by said connecting member,
    alternate of said strap members being reversely bent in opposite directions to have their free ends inserted within adjacent end portions of said conduit, said strap members overlying said stiffening member, and
    one of said strap members having a perforated end portion and being upstanding, forming hanging means.

3. An apparatus for connecting adjacent abutting ends of non-metallic conduit having in combination,
    an endless connecting member of a form and size in cross section to be received within said abutting ends of said conduit,
    an endless collar having a height of the thickness of said conduit embracing said connecting member to be disposed between said abutting ends,
    a plurality of strap members integral with said connecting member formed therefrom and upstanding therefrom,
    alternate of said strap members being oppositely reversely bent to overlie said stiffening member and engage the adjacent end portions of said conduit,
    one of said strap members being disposed to be upstanding, and
    said last mentioned strap member having a perforated free end portion forming a hanging means.

References Cited

UNITED STATES PATENTS

| | | | |
|---|---|---|---|
| 1,803,269 | 1/1914 | Bradnack | 285—257 |
| 1,983,989 | 12/1934 | Pallas | 285—397 |
| 2,259,737 | 10/1941 | Cunningham | 285—424 |
| 2,396,030 | 3/1946 | Terry | 285—257 |
| 2,491,700 | 12/1949 | Zwerling | 285—424 |
| 2,498,753 | 2/1950 | Dietsch | 285—424 |

CARL W. TOMLIN, *Primary Examiner.*

W. L. SHEDD, *Assistant Examiner.*